United States Patent [19]

Marcellini

[11] 4,002,263
[45] Jan. 11, 1977

[54] LEAKPROOF MOUNTING DEVICE FOR THE SUPPORT PLATE OF A FLUIDIZATION REACTOR GRID

[75] Inventor: Robert Marcellini, Freyming-Merlebach, France

[73] Assignee: Charbonnages de France, Paris, France

[22] Filed: June 6, 1975

[21] Appl. No.: 584,414

[30] Foreign Application Priority Data

June 11, 1974  France .............................. 74.20106

[52] U.S. Cl. ............................... 220/378; 277/121; 277/190
[51] Int. Cl.² ....................................... B65D 53/06
[58] Field of Search .................... 220/378, 200, 71; 277/190, 117, 121

[56] References Cited
UNITED STATES PATENTS

| | | | |
|---|---|---|---|
| 2,599,212 | 6/1952 | Triplett | 220/378 |
| 2,744,217 | 5/1956 | Aikman | 220/378 |
| 3,294,408 | 12/1966 | Smith | 277/117 |
| 3,298,794 | 1/1967 | Mikesell, Jr. et al. | 220/378 |

FOREIGN PATENTS OR APPLICATIONS

| | | | |
|---|---|---|---|
| 81,618 | 7/1963 | France | 220/378 |
| 1,260,797 | 4/1961 | France | 220/378 |

*Primary Examiner*—William Price
*Assistant Examiner*—Joseph M. Moy
*Attorney, Agent, or Firm*—Karl W. Flocks

[57] ABSTRACT

A support plate of a fluidization reactor grid is mounted in the body of the reactor between a support bracket and a ring, both of which extend around the inside of the reactor, and which are spaced apart to define an annular space in which the periphery of the support plate is located.

This mounting is made leakproof by two seals between the support plate and the bracket and the ring, one of which seals is clamped so that it expands between the support plate and the bracket.

2 Claims, 1 Drawing Figure

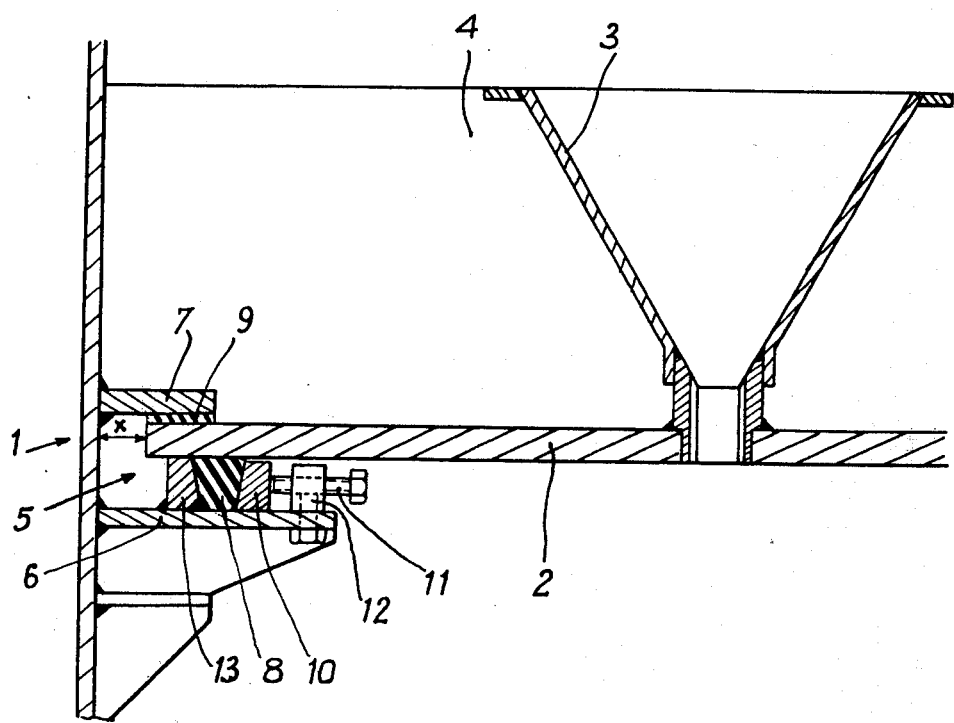

4,002,263

LEAKPROOF MOUNTING DEVICE FOR THE SUPPORT PLATE OF A FLUIDIZATION REACTOR GRID

BACKGROUND OF THE INVENTION

The invention relates to a leakproof mounting device for a support plate of a fluidisation grid, which plate rests on a peripheral bracket located inside the reactor.

Grid support plates in fluidisation reactors are assembled in one or more parts, and there is deterioration in the course of time of the seal between a plenum chamber supplying fluidisation gas and the actual reactor. The resulting gas leaks seriously jeopardise the proper operation of the apparatus, because the fluidisation gas under pressure in the plenum chamber passes partly through pyramidal orifices which form the grid and partly through cracks, which are mainly around the periphery of the support plate, the plate usually being of refractory cast iron. Even if the total fluid flow of fluid can still be controlled the leaks through such cracks reduce uncontrollably the fluid flow through the grid orifices. This results in poor fluidisation of the material in the reactor, and possibly clogging or caking when the materials are subject to agglutination.

From French Pat. No. 1,260,797 and French first Patent of Addition No. 81618 there is known a device of the type already described in which a U-shaped clamping device is engaged between a fixed plate and a support fixed to a wall to clamp the plate against a support of the wall. However, in this device, the support is necessarily below the plate and the clamping device is located above. This device cannot therefore be operated when the plate supports a refractory mass, for example refractory concrete.

An object of the invention is to overcome the aforesaid disadvantages and to permit leakproof mounting of a support plate resting on a peripheral bracket and providing nevertheless accessible leakproof clamping means, if necessary below the plate.

SUMMARY

A support plate for a fluidisation reactor grid is in one piece and is housed with slight radial clearance in an annular space defined around the inside of the reactor between a peripheral bracket and by a peripheral ring which are spaced apart axially of the reactor. Annular seals are arranged each side of the plate in the annular spaces separating the plate from the bracket and from the ring, and at least one of the two seals may be clamped by expansion between the plate and the bracket.

BRIEF DESCRIPTION OF THE DRAWING

The single FIGURE is a view in partial vertical section of a fluidisation reactor provided with a leakproof mounting device according to the invention.

DESCRIPTION OF THE PREFERRED EMBODIMENT

A fluidisation reactor designated generally by the reference 1 includes a plate 2 of refractory steel which acts as support plate for the grid of the fluidisation reactor. This grid consists of inverted pyramidal orifices 3 of refractory steel mounted contiguously in refractory cement 4.

The plate 2 is inserted with slight radial clearance $x$ in an annular space 5 defined around the inner periphery of the reactor 1 and bounded at the bottom by a peripheral bracket 6, and at the top by a peripheral ring 7 which can be welded to the inside wall of reactor 1 after the introduction of plate 2 into position. An upper annular seal 9 and a lower annular seal 8 are disposed one on each side of the plate 2. The bottom seal 8 is clamped for expansion between the bracket 6 and the plate 2 by means of wedges 10, which are subjected to the thrust of clamping screws 11 carried by support 12 fixed on the bracket 6. A ring 13 which is fixed on the bracket provides reaction to the thrust. The wedges 10 are substantially contiguous annular segments.

The support plate is of refractory steel and the seals 8 and 9 are of any suitable material, such as asbestos fibres and graphite covered with woven asbestos reinforced with refractory metal fibres. The seal may be coated with tungsten sulphide. Depending on the size of the installation, the seal may be segmented.

I claim:
1. A leakproof mounting device for a support plate of a grid of a fluidisation reactor comprising
    a one piece grid support plate,
    a peripheral bracket mounted inside the reactor on its inside peripheral surface,
    a peripheral ring also mounted inside the reactor on its wall spaced from said bracket forming an annular space bounded in height by said peripheral ring and said peripheral bracket, and by an inner wall of the reactor between said ring and said bracket,
    annular seals respectively disposed on both sides of said plate in annular spaces separating said plate from said bracket and said ring,
    said lower seal and said bracket supporting said plate with a slight radial clearance relative to the inside wall of the reactor,
    means to clamp said lower seal to expand said lower seal in its direction between said plate and said bracket,
    said clamping means including
        wedges which are substantially contiguous annular segments along a circumference of said lower seal, and
        clamping screws located to clamp said lower seal against said wedges.
2. A device according to claim 1, wherein said grid support plate is of refractory steel.

\* \* \* \* \*